No. 886,083.
PATENTED APR. 28, 1908.
C. SMITH.
DISCHARGE STEM.
APPLICATION FILED JAN. 28, 1908.
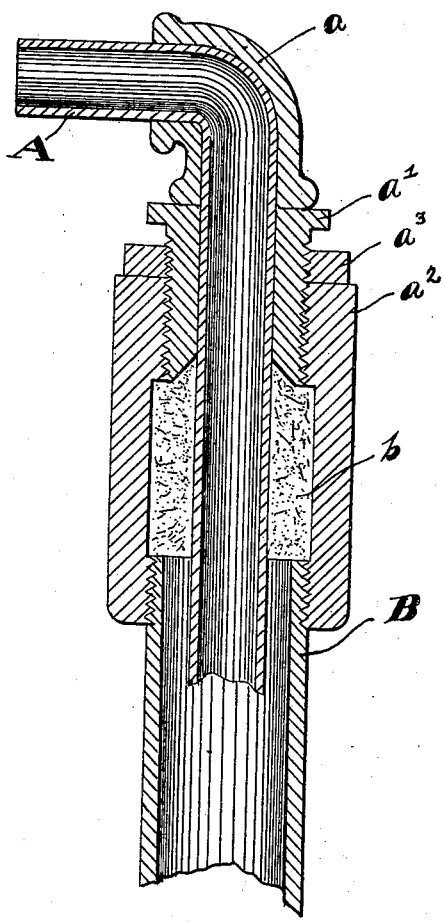
WITNESSES
Benjamin H. Edwards
D. Hubert Jones
INVENTOR
Chris Smith
BY Walter A. Knight
ATTORNEY

UNITED STATES PATENT OFFICE.

CHRISTOPHER SMITH, OF ORRVILLE, OHIO, ASSIGNOR TO THE CYCLONE DRILL COMPANY, OF ORRVILLE, OHIO, A CORPORATION OF OHIO.

DISCHARGE-STEM.

No. 886,083.   Specification of Letters Patent.   Patented April 28, 1908.

Application filed January 28, 1908. Serial No. 413,142.

*To all whom it may concern:*

Be it known that I, CHRISTOPHER SMITH, a citizen of the United States, residing at Orrville, in the county of Wayne and State of Ohio, have invented new and useful Improvements in Discharge-Stems, of which the following is a specification.

This invention relates to new and useful improvements in discharge stems, and particularly to those stems employed in churn drilling, where the drilling elements have a vertical reciprocatory motion. Heretofore such stems have been made either by threading pipe into an elbow or by simply bending a tube or pipe, and a great amount of trouble has been experienced in the use of such devices, as the jarring, common in drill practice, would, in the threaded type, work the threaded stem loose or break the threads; when plain bent pipe stems were used, the stem was cut out quickly in the bend or elbow by adjacent parts. Such plain stems also jammed and bound.

The object of this invention is to provide a stem that will be durable and avoid all the difficulties mentioned above.

My invention is illustrated in the accompanying drawing: which is a full section through the entire device.

Referring to the drawing, A is the discharge stem a bent tube or pipe re-inforced at its elbow or bend by an outside elbow $a$, cast around the bent tube. Slidable on the outside of the stem A and having its upper face adjacent to the lower face of the elbow $a$, is packing nut $a^1$ threaded in a packing box $a^2$. The lower face of nut $a^1$ is preferably slanted as shown in the drawing.

Packing box $a^2$ is threaded to hollow drill spindle B. Between the lower face of packing nut $a^1$ and the upper face or drill spindle B is a suitable packing $b$ inclosed by packing box $a^2$. By screwing the packing nut $a^1$ down into the packing box $a^2$ the packing $b$ is compressed and an adjustable fluid tight joint is formed. Jam nut $a^3$, if tightened, prevents the accidental displacement of the packing nut $a^1$ in the packing box $a^2$. Pulsations of the fluid pumped through the stem, cause the stem to rise slightly in the packing box, but the packing nut $a^1$ is prevented from wearing into or binding against the stem A, by contacting with the lower face of the re-inforcing elbow $a$, which in casting has shrunk tight and become immovably fixed to the stem, and there are no threads to become defective.

What I claim as my invention and desire to secure by Letters Patent of the United States, is:

1. A discharge stem, having a bent tube reinforced at its bend by an elbow cast thereon.

2. A discharge stem, comprising a bent metal tube with an elbow cast thereon inclosing the bend of said stem, a packing nut, whose upper face is adjacent to the lower face of the reinforcing elbow and is threaded underneath into a packing box adapted to receive the discharge stem; said packing box, a jam nut threaded to packing nut, and a threaded opening in the under side of said packing box adapted to receive a drill spindle.

In testimony whereof I have hereunto set my hand in presence of two subscribing witnesses.

CHRIS. SMITH.

Witnesses:
A. J. CUSTER,
T. M. KRIEGER.